United States Patent

Bochum et al.

Patent Number: 5,528,619
Date of Patent: Jun. 18, 1996

[54] GAS DISCHARGE STRUCTURE

[75] Inventors: Hansjoerg Bochum, Stuttgart; Rolf Nowack, Leonberg; Hans Opower, Krailling; Wolfram Schock, Boeblingen; Klaus Wessel, Stuttgart, all of Germany

[73] Assignee: Deutsche Forschungsanstalt fuer Luft-und Raumfahrt e.V., Bonn, Germany

[21] Appl. No.: 436,757

[22] Filed: May 8, 1995

[30] Foreign Application Priority Data

May 13, 1994 [DE] Germany .......................... 44 16 900.0

[51] Int. Cl.$^6$ ............................................. H01S 3/097
[52] U.S. Cl. .................... 372/87; 372/95; 372/55
[58] Field of Search ................... 372/87, 86, 62, 372/61, 69, 92, 55

[56] References Cited

U.S. PATENT DOCUMENTS

| | | | |
|---|---|---|---|
| H882 | 1/1991 | Fox | 372/62 |
| 4,547,883 | 10/1985 | Cohn et al. | 372/87 |
| 4,885,754 | 12/1989 | Egawa | 372/86 |

OTHER PUBLICATIONS

V. Rousseau, et al., *Efficient Pulsed Microwave Excitation of a High–Pressure Excimer Discharge*, J. Appl. Phys., vol. 71, No. 11, 1 Jun. 1992, pp. 5712–5714.

*Primary Examiner*—Leon Scott, Jr.
*Attorney, Agent, or Firm*—Barry R. Lipsitz

[57] ABSTRACT

In order to produce a gas discharge structure for two-dimensionally extending gas discharges comprising a pair of electrodes including a first and a second electrode which have mutually facing electrode surfaces, a gas discharge space arranged between the electrode surfaces with a plasma gas provided therein and a high frequency source with which a current can be fed into the pair of electrodes for producing a plasma between the first and the second electrode, in such a way that wavelength dependent modulations of the field strength substantially no longer occur in the gas discharge space, it be proposed that, the electrode surface of the first electrode is divided into two partial electrode surfaces that are located adjacent to one another in this electrode surface but are electrically separated from one another, that the partial electrode surfaces have mutually facing edge regions which extend at a defined distance from one another, that the partial electrode surfaces be connected to two terminals of the high frequency source which are at different potentials in such a way that a surface current flows over one of the edge regions to and then over the other one and that the second electrode be at an intermediate potential which lies between that of the two partial electrodes.

31 Claims, 11 Drawing Sheets

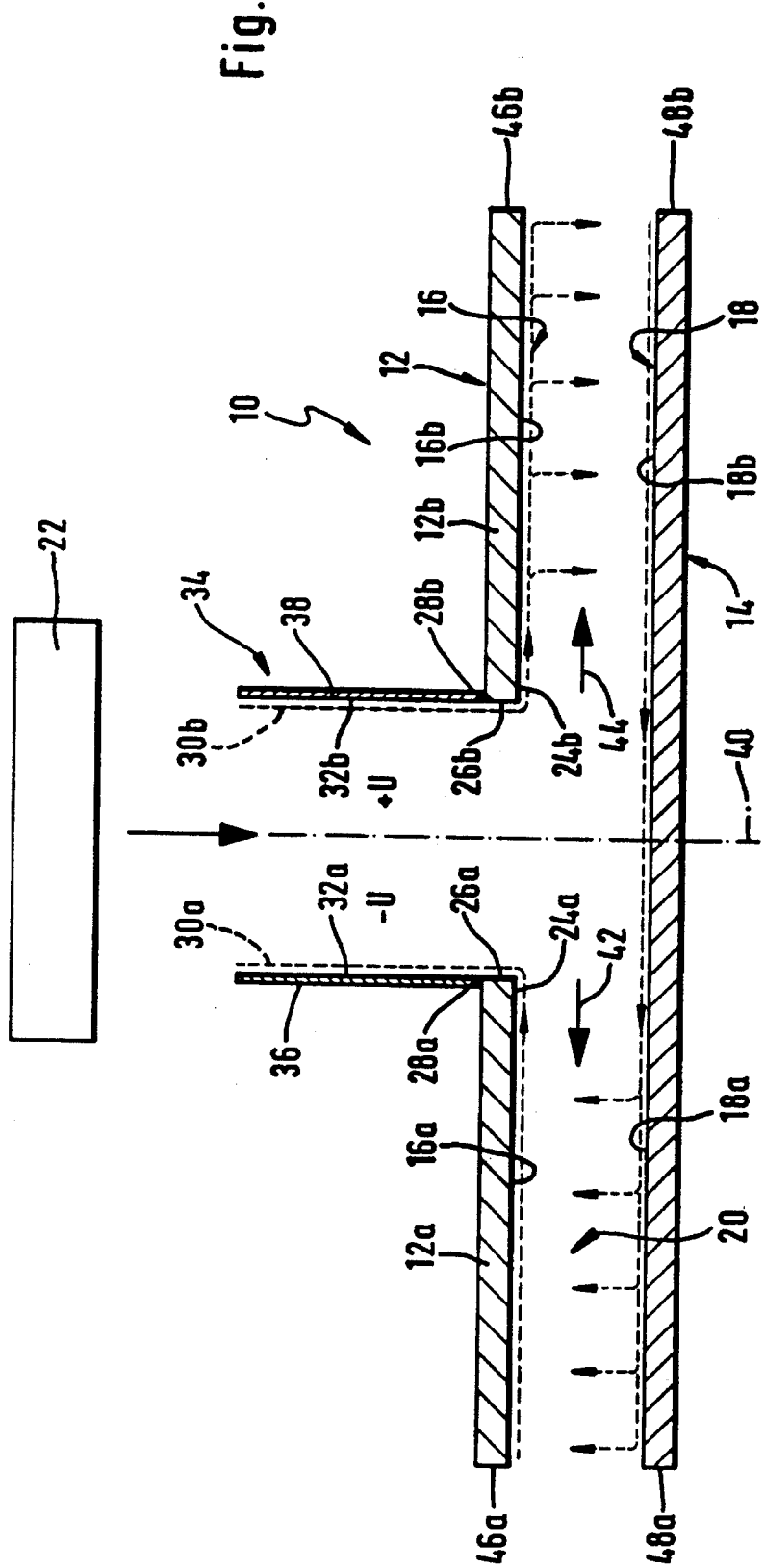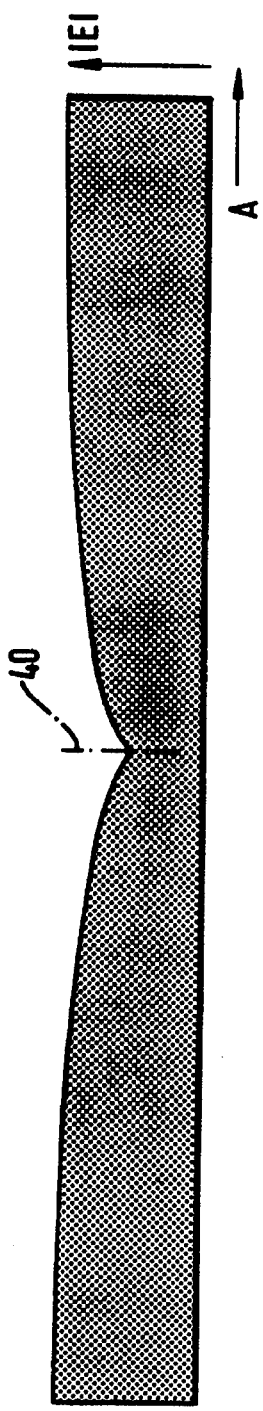

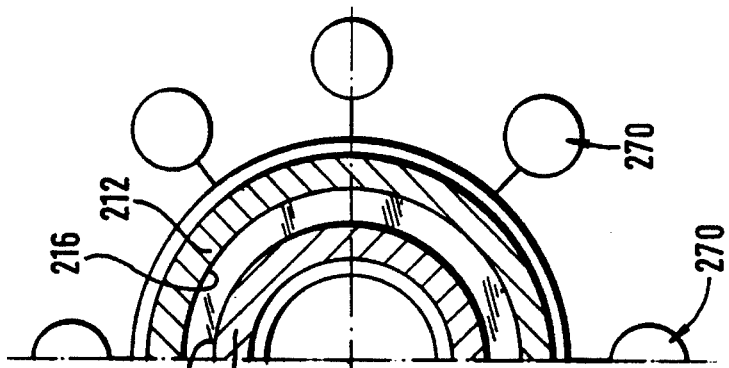
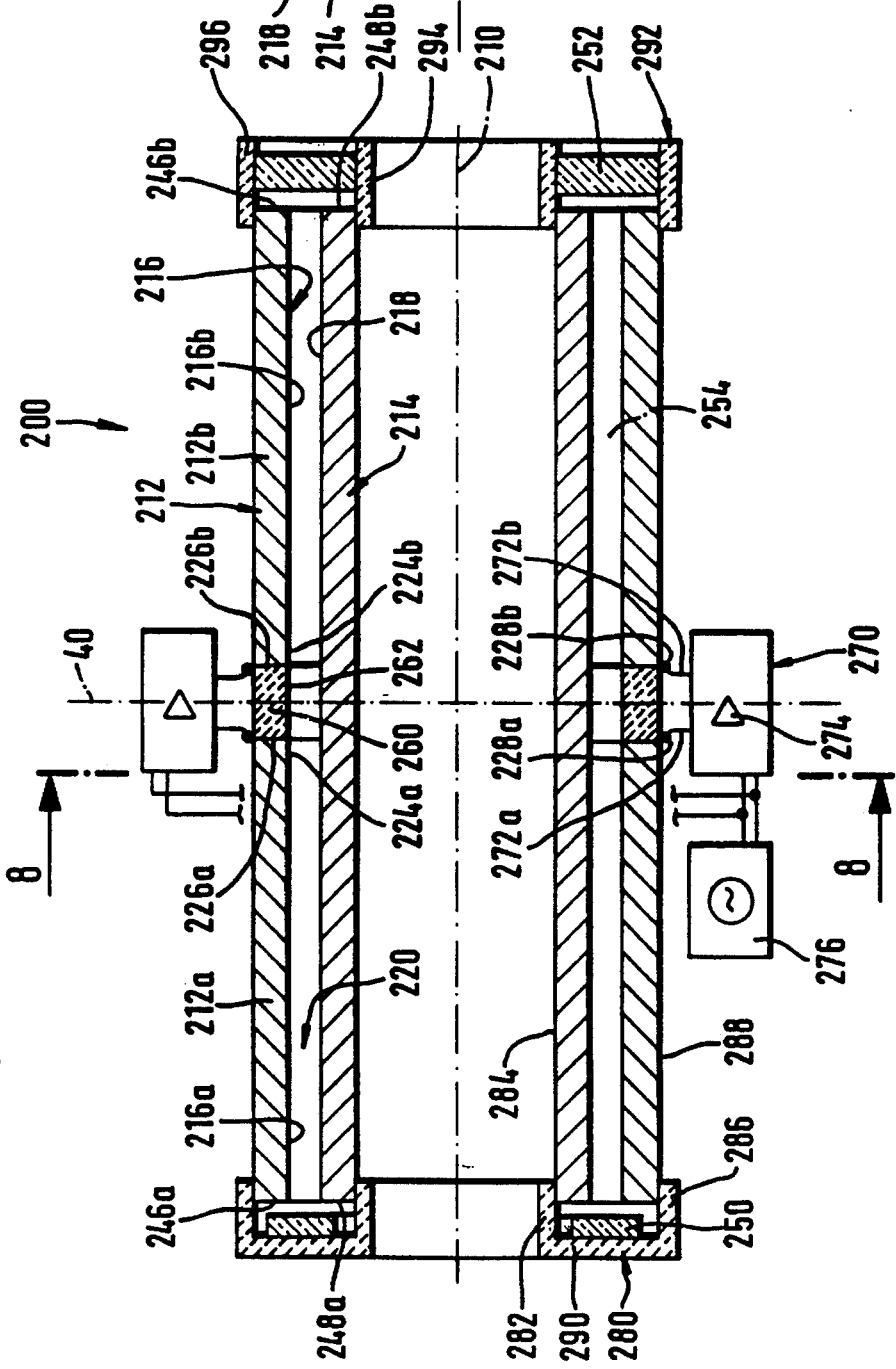

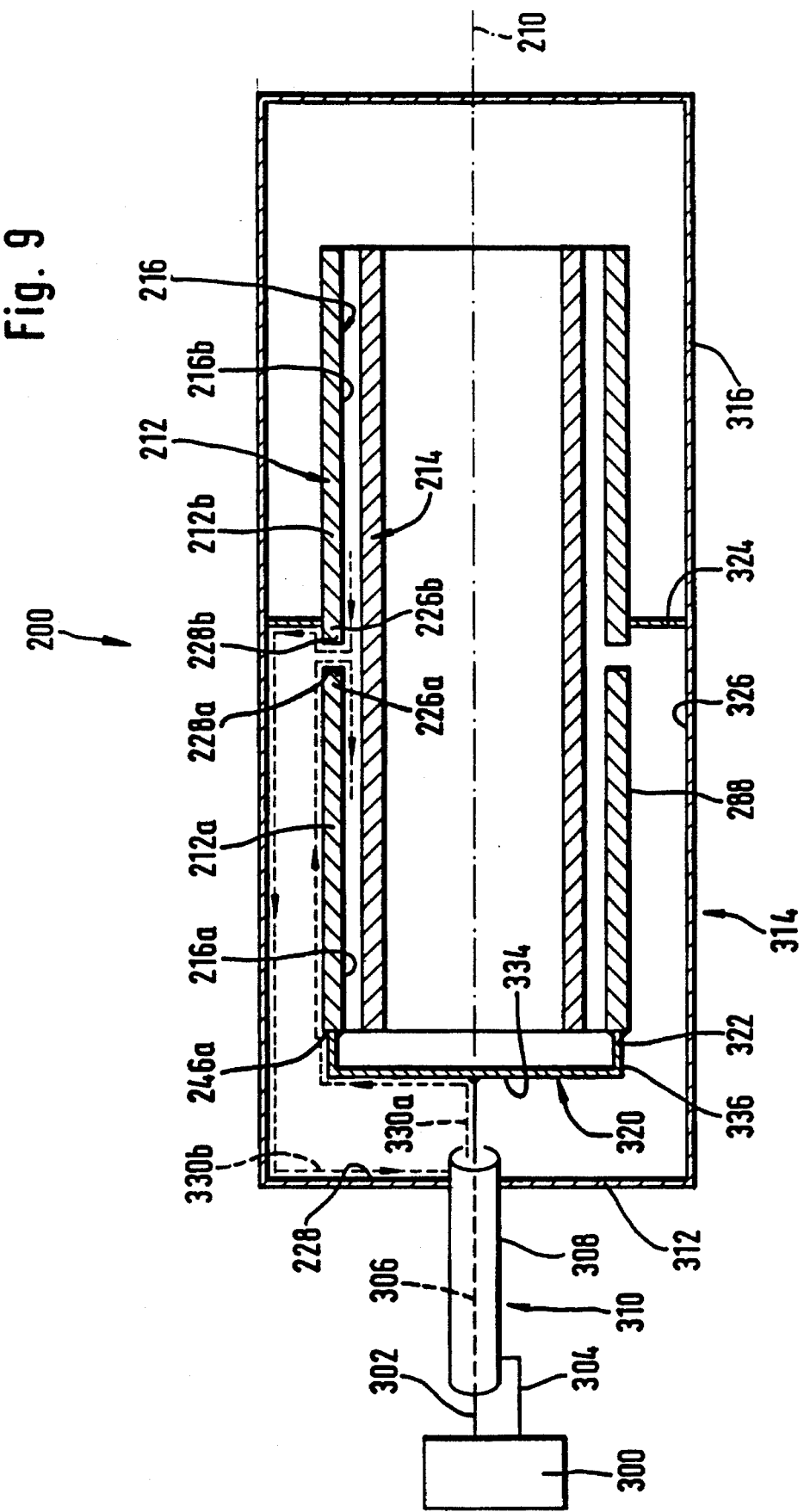

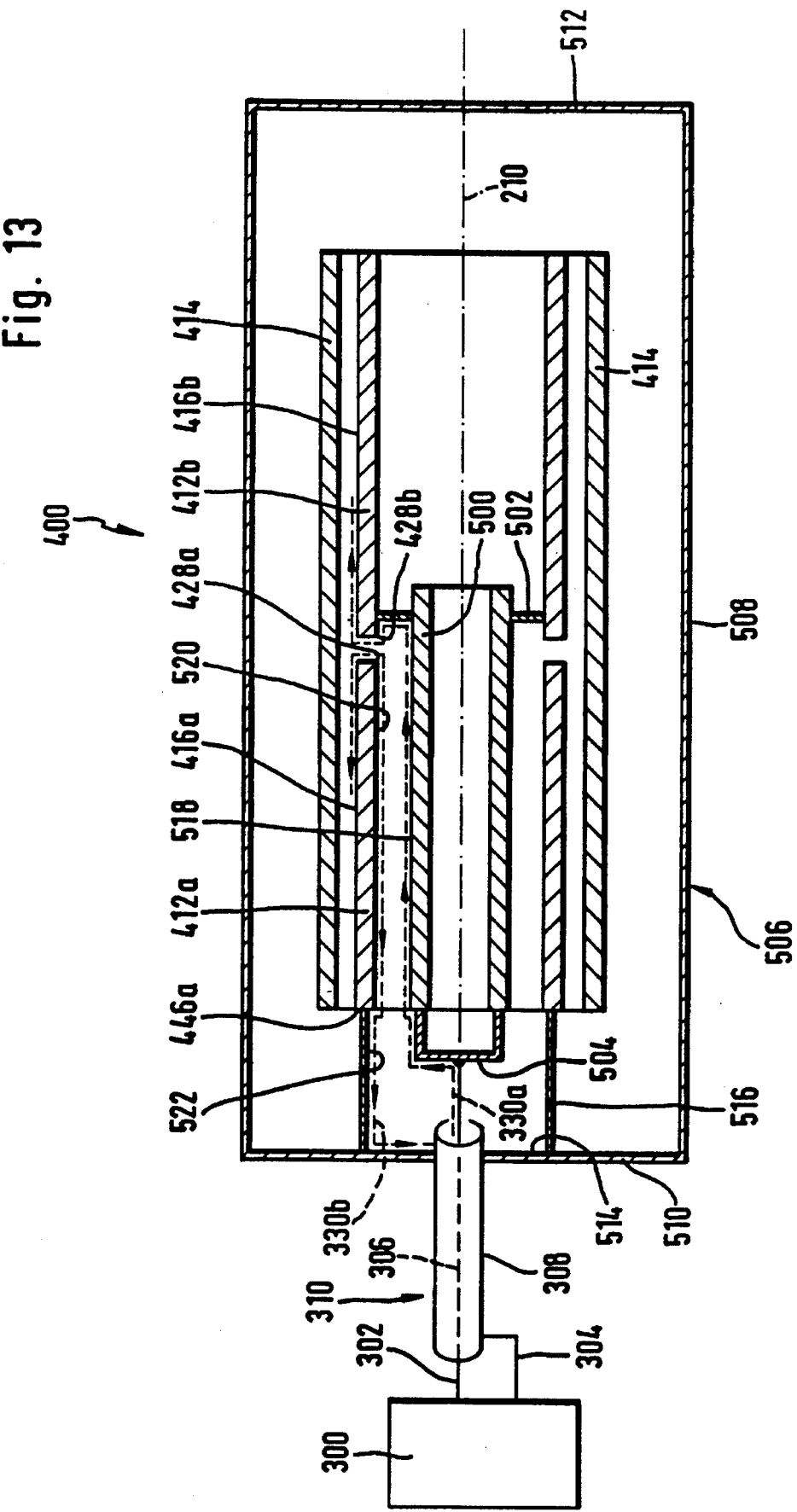

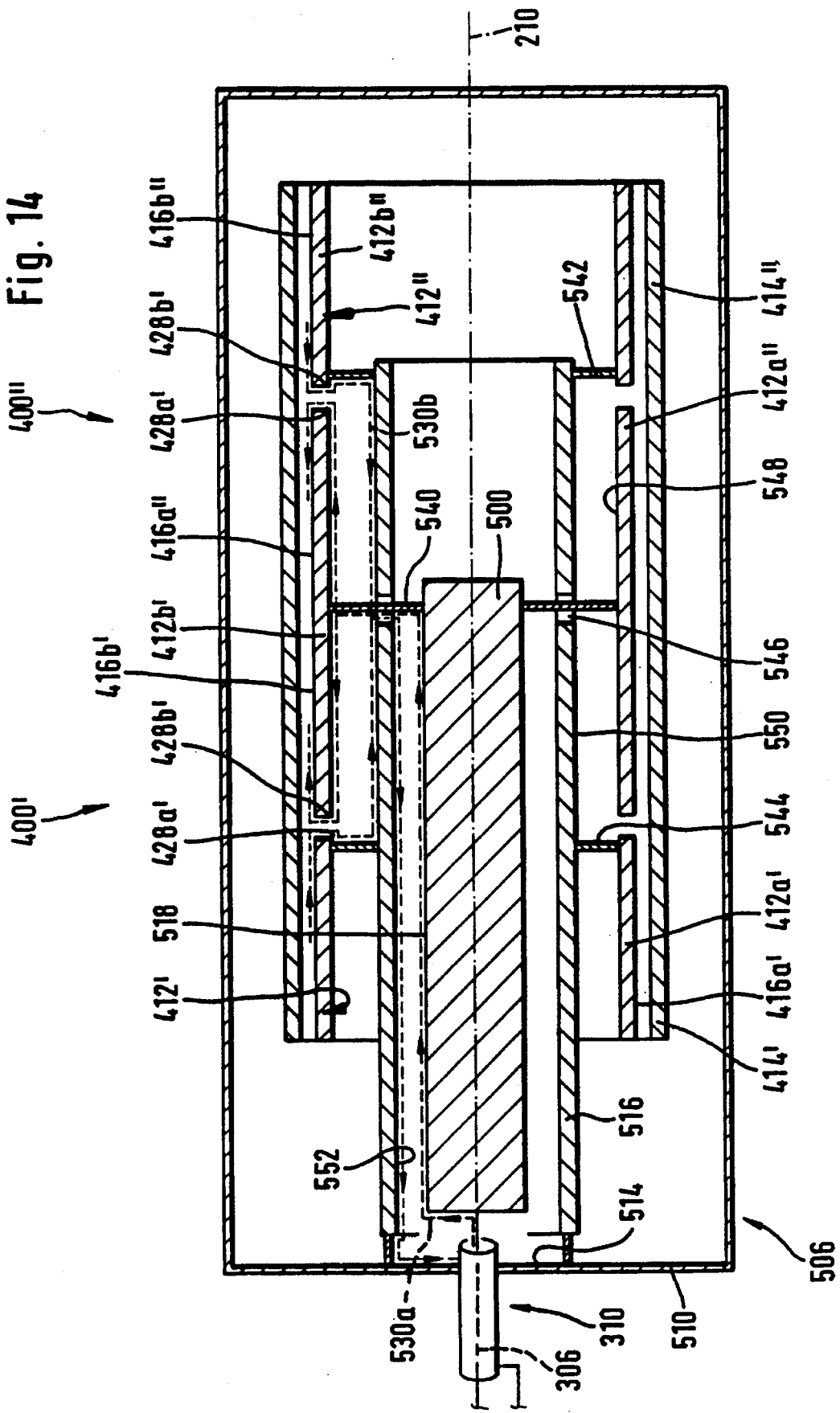

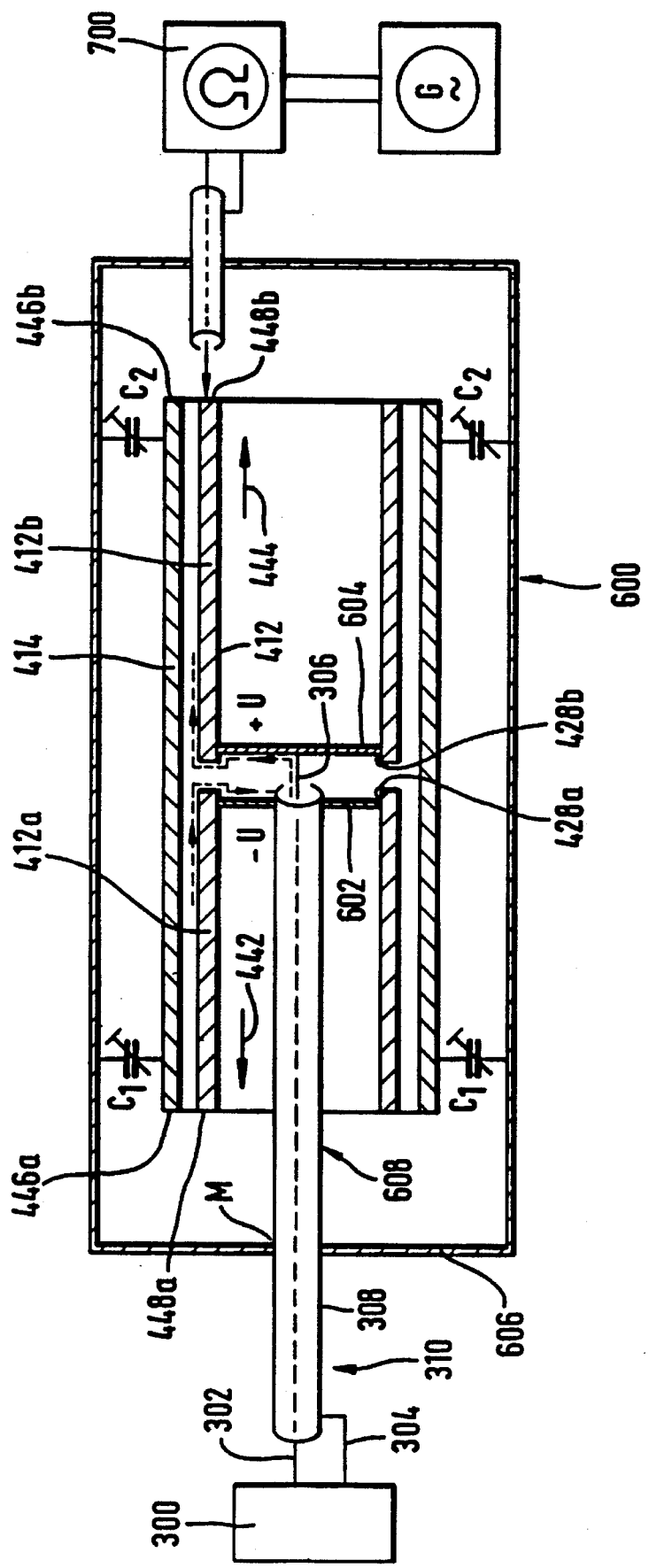

GAS DISCHARGE STRUCTURE

BACKGROUND OF THE INVENTION

The invention relates to a a gas discharge structure, in particular for laser waveguides, which structure exhibits a two-dimensionally extending gas discharge and comprises a pair of electrodes including a first and a second electrode which have mutually facing electrode surfaces, a gas discharge space arranged between the electrode surfaces with a plasma gas provided therein and a high frequency source with which a current can be fed into the pair of electrodes for producing a plasma between the first and the second electrode.

Gas discharge structures of this type form the subject matter for example of DE 37 29 053, DE 38 28 952 or DE 38 28 951.

In order to attain greater powers in gas discharge structures of this type which are utilised in laser waveguides where large electrode surfaces are required, problems arise since, when using large electrode surfaces, the discharge for the excitation of the plasma forming gas, referred to hereinafter as a plasma gas, exhibits a wavelength dependent spatial modulation of the electrical field strength in the gas discharge space when there is an excitation using high frequency current in the UHF range, preferably in the range of approximately 100 MHz or more.

Field strength modulations of this type may, for example, as is known from the U.S. Pat. Nos. 4,169,251 or 4,352,188, be compensated to some extent by inductances disposed at the edges of the electrodes or by external networks, whereby the arrangement of these inductances and the matching thereof is expensive and also varies from case to case, for example, with the parameters of the gas discharge and the power being coupled-in, so that a renewed matching of the inductances is in many cases necessary when there is an alteration of just a single parameter.

A further possibility of making the gas discharge more homogeneous, which is known from the U.S. Pat. No. 4,751,717, consists in the multiple supply of the high frequency power, distributed over the discharge structure, but this too is very expensive.

SUMMARY OF THE INVENTION

Consequently, the object of the invention is to develop a gas discharge structure, particularly for laser waveguides, in which wavelength dependent modulations of the field strength substantially no longer occur in the gas discharge space.

In accordance with the invention, this object is achieved in a gas discharge structure of the type described hereinabove in that the electrode surface of the first electrode is divided into two partial electrode surfaces that are located adjacent to one another in this electrode surface but are electrically separated from one another, that the partial electrode surfaces have mutually facing edge regions which extend at a defined distance from one another, that the partial electrode surfaces are connected to two terminals of the high frequency source which are at different potentials in such a way that a surface current flows-off over one of the edge regions to and then over the other one and that the second electrode is at an intermediate potential which lies between that of the two partial electrodes.

The advantage of the solution in accordance with the invention can be seen in that it allows, in simple manner, a distribution of the current density over the two-dimensionally extending gas discharge which is as uniform as possible, so that, in essence, modulations of the field strength no longer occur and, in particular, that additional inductances—insofar as these were needed for the suppression of the wavelength dependent modulations of the field strength—are not required.

In principle, the second electrode could be constructed such that it can be pre-specified with regard to its potential. A particularly beneficial solution provides that the second electrode is at an intermediate potential which is such that a current density in the plasma between the two partial electrode surfaces and the regions of the second electrode located opposite thereto is approximately the same. Using this solution, one has the possibility of achieving a uniform current density in the two-dimensionally extending gas discharge by means of the intermediate potential.

This state can be simulated for example, by externally wiring the second electrode.

However, it is even more advantageous if the second electrode is arranged to be potential-free so that the intermediate potential is automatically adjusted in that it sets itself automatically in accordance with the construction of the partial electrode surfaces such that the current densities in the plasma between the two partial electrode surfaces and the regions of the second electrode located opposite thereto are approximately the same.

It is particularly advantageous for the achievement, as desired in accordance with the invention, of a current density which is as uniform as possible over the two-dimensional gas discharge, if a substantially constant field strength exists between each of the partial electrode surfaces and the region of the second electrode located opposite thereto.

Preferably thereby, the field strength has a value which is such that it corresponds to the maximum value of the field strength for an electric waveguide formed by the electrode surfaces.

This can be achieved, in particular, if the electrode surfaces form an open end at the waveguide ends thereof which are remote from the mutually facing edge regions of the partial electrode surfaces, at which end, the maximum field strength in a waveguide is located.

In connection with the previous explanation of the individual embodiments, no detailed indications have been given as regards the manner of construction of the partial electrode surfaces. Thus, it is advantageously provided that, commencing from the mutually facing edge regions, the partial electrode surfaces extend in two mutually opposite directions.

Preferably thereby, it is proposed that the partial electrode surfaces extending in the mutually opposite directions have a respective elongation which is less than one fifth—preferably, less than one tenth—of the wavelength of the high frequency so that any wavelength dependent inhomogeneities are, to a large extent, immediately suppressed by the limitation of the extension of the partial electrode surfaces.

This solution is particularly advantageous when the electrodes, at their ends which are remote from one another, form respective electric waveguides having open ends at which the maximum field strength occurs so that, when limiting the extension of the partial electrode surfaces in the respective directions to less than one fifth of the wavelength, there occurs over the whole extension of the partial electrode surfaces in this direction, a field strength which lies close to the maximum value of the field strength since, commencing from the open end at the ends which are remote from one another, a minimum of the field strength cannot occur when using an extension of the partial electrode surfaces of this type.

Up to now, no detailed indications have been given as regards the construction of the first electrode supporting the partial electrode surfaces.

Thus, one advantageous embodiment provides that the two partial electrode surfaces be supported by two electrically insulated partial electrodes.

Preferably, the partial electrodes are then connected in turn to feed terminals for a high frequency supply line.

The supply of current to the partial electrodes may thereby be effected in the most diverse of manners, for example, it is conceivable to let a surface current flow via a rearward region of the partial electrodes which is located opposite to the partial electrode surfaces. However, it is particularly advantageous when the feed terminal of one of the partial electrodes is located in an end region which faces the other partial electrode.

The supply of current can be effected even more advantageously if the feed terminal is located at an edge of the respective partial electrode which faces the other partial electrode.

Purely theoretically, it would be conceivable to provide a multiple feed by one and the same partial electrode and the corresponding second electrode. However, the solution in accordance with the invention is particularly simple when the surface current for the production of the plasma flows-in exclusively over the edge regions of the two partial electrode surfaces.

Furthermore, it is advantageous if the supply of current occurs via a rear surface of the first electrode which is remote from the second electrode since, in this case, a particularly simple arrangement for the supply of current is then possible.

Now, in order to prevent the formation of a plasma between the mutually facing end regions of the partial electrodes, it is preferably provided that the mutually facing edge regions of the partial electrode surfaces extend at a distance from one another which is such that a part of the gas discharge space bordering thereon is free of any plasma being formed between these edge regions.

This is possible, in particular, when the edge regions have a separation from each other which is significantly less than the optimum separation for the currently used plasma gas under the currently applicable edge conditions. The formation of plasma is, in this case, suppressed to a sufficient degree.

However, the formation of a plasma between the mutually facing wall surfaces of the end regions of the partial electrodes could also occur. For this reason, it is advantageous if these wall surfaces extend at a distance from one another which is such that the formation of a plasma does not occur therebetween.

In addition or as an alternative thereto, a further way of suppressing the formation of a plasma between the mutually facing edge regions of the electrode surfaces is then possible if an isolating medium is inserted between the mutually facing end regions of the partial electrodes. This isolating medium serves especially for displacing the plasma gas from those regions in which the end regions of the electrodes have a separation which is such that the formation of a plasma could occur.

Here, the opportunity exists of placing the isolating medium between the mutually facing end regions of the partial electrodes i.e. such that it extends up to the first electrode surface.

As an alternative thereto, it is envisaged to insert the electrically isolating medium in those regions in which the end regions of the partial electrodes are at a separation from one another which would lead to the formation of a plasma if a plasma gas were to be located therebetween.

In connection with the previous explanation of the individual embodiments, no detailed indications have been given as regards the nature of the high frequency supply line. Thus, one advantageous embodiment envisages that the high frequency line be formed as an electric waveguide leading from the high frequency source to the feed terminals.

Furthermore, it is preferably provided that the high frequency supply line to at least one of the feed terminals be effected by means of a terminal cylinder which is connected to an inner conductor of a coaxial cable.

In this case, a coaxial cable is utilised for establishing the connection to the high frequency source and the terminal cylinder is utilised for establishing a suitable connection of the inner conductor of the coaxial cable to one of the partial electrode surfaces.

Preferably, in a further advantageous embodiment, the high frequency supply line up to the feed terminals is formed as a surface current conducting waveguide so that, in particular thereby, one has the advantage of an excellent impedance match.

In the simplest case, the high frequency supply line may be formed as an asymmetrical high frequency supply line so that one lead is at the voltage U and one lead is at earth potential and, in correspondence therewith, so too the potentials of the partial electrodes connected thereto lower down.

However, it is even more advantageous if the high frequency supply line is constructed such that it feeds the partial electrodes symmetrically and hence the partial electrodes are at the potentials $-U/2$ and $+U/2$.

This can be realised in that the high frequency generator already has symmetrical outputs. It is particularly expedient if the high frequency supply line comprises a symmetrical member or, even better, if it forms a symmetrical member together with the pair of electrodes. The advantage of symmetrical feeding can be seen in that the formation of parasitic plasma relative to earth, for example, relative to mirror and mirror mountings, can be more easily overcome in this case than in the case of an asymmetrical feed.

In many of the gas discharge structures in accordance with the invention, it is provided that the electric waveguide be constructed as a power splitting spur feeder whose distribution ratio is adapted such that the current density in the plasma is substantially the same in all of the gas discharge structures.

Furthermore, in order to achieve an excellent geometrical matching, especially to cylindrical electrode surfaces, it is provided that the electric waveguide have cylindrical, surface current conducting surfaces.

In one advantageous embodiment, it is provided, in expedient manner, that the waveguide have cylindrical waveguide surfaces and studs for establishing a connection to the partial electrodes, which studs extend radially of the cylindrical waveguide surfaces.

Here, the studs may be tongues which are adjacently located in the azimuthal direction.

Preferably thereby, there are provided a plurality of studs which are disposed around the axis of the cylinder.

As an alternative to the provision of studs, one preferred embodiment provides that a terminal disc, especially one having the form of an annular disc, be arranged between the terminal cylinder and a feed terminal of a partial electrode.

This terminal disc may also be formed in segmented manner, for example, in the form of individual tongues.

In order to achieve the least possible emission of high frequencies when using the gas discharge structure in accordance with the invention, it is preferably provided that the gas discharge structure be surrounded by a screening means. Now basically, the screening means can be provided as a separate item. However, it is particularly advantageous if the screening means is a part of the high frequency supply line.

Preferably, when making use of the screening means as a part of the high frequency supply line, it is provided that the screening means be connected to that part of the high frequency supply line which is at earth potential.

As an alternative to this, the high frequency supply line can be realised in that the high frequency source is arranged in the immediate vicinity of the feed terminals so that it is possible to have leads between the high frequency source and the feed terminals which are kept as short as possible. Furthermore, it is particularly expedient if the feed terminals are connected substantially directly to an output of the high frequency source.

In principle, the electrode surfaces may be flat surfaces or surfaces which extend arbitrarily in two-dimensions. The solution in accordance with the invention is particularly advantageous when the electrode surfaces are cylindrical surfaces.

Preferably, the electrode surfaces are formed as cylindrical surfaces which are closed in the azimuthal direction and which, in especially expedient manner, extend coaxially of one another.

Preferably, in a case of this sort, it is provided that the partial electrode surfaces extend in opposite directions and are respectively parallel to the axis of the cylinder.

Up to now, no definitive indications have been given as regards the gas discharge structure. The gas discharge structure in accordance with the invention is suitable, particularly advantageously, where it is part of a laser waveguide, in particular, a diffusion cooled laser waveguide.

In this case, it is preferably envisaged, that optical waveguide surfaces, which guide a radiation field of the laser waveguide between mirrors thereof, be arranged between the pairs of electrodes.

It is provided thereby, in the simplest case, that the electrode surface of the second electrode forms an optical waveguide surface for the laser beam.

Furthermore, it is likewise advantageously provided that the electrode surface of the first electrode likewise forms a waveguide surface by means of its partial electrode surfaces, whereby the spacing between the mutually facing edge regions of the partial electrode surfaces is less than the distance apart of the electrode surfaces in order to keep any disturbance to the optical waveguide between the end regions of the partial electrode surfaces as small as possible. Consequently, the spacing is preferably made as small as possible.

As an alternative to this, the intervening gap is is bridged by an insulating section having an outer face which expands the partial electrode surfaces into a continuous optical waveguide surface between the mutually facing edge regions thereof.

As an alternative thereto, it is envisaged, in advantageous manner, that a dielectric element, which supports the optical waveguide surface, be located on the partial electrode surfaces and that, in particular, the element should also extend over the intermediate space between the mutually facing edge regions of the partial electrode surfaces.

Other features and advantages of the invention form the subject matter of the subsequent description and the sketched illustration of a few embodiments.

BRIEF DESCRIPTION OF THE DRAWINGS

FIG. 1 a longitudinal section through a gas discharge structure in accordance with the invention wherein the illustration is shortened in the longitudinal direction;

FIG. 2 an illustration of the field distribution in the longitudinal direction of the gas discharge structure in accordance with FIG. 1;

FIG. 7 a longitudinal section similar to FIG. 1 through a second embodiment of a gas discharge structure in accordance with the invention which is integrated into a laser waveguide having cylindrical waveguide surfaces;

FIG. 8 a section along the lines 8—8 in FIG. 7;

FIG. 9 a longitudinal section similar to FIG. 7 through a first variant of the second embodiment of the gas discharge structure;

FIG. 13 a longitudinal section similar to FIG. 12 through a first variant of the third embodiment of the gas discharge structure in accordance with the invention;

FIG. 14 a longitudinal section similar to FIG. 12 through a second variant of the third embodiment of the gas discharge structure in accordance with the invention and FIG. 15 a longitudinal section similar to FIG. 1 through a fourth embodiment of the gas discharge structure in accordance with the invention.

DETAILED DESCRIPTION OF THE INVENTION

Figure 3:
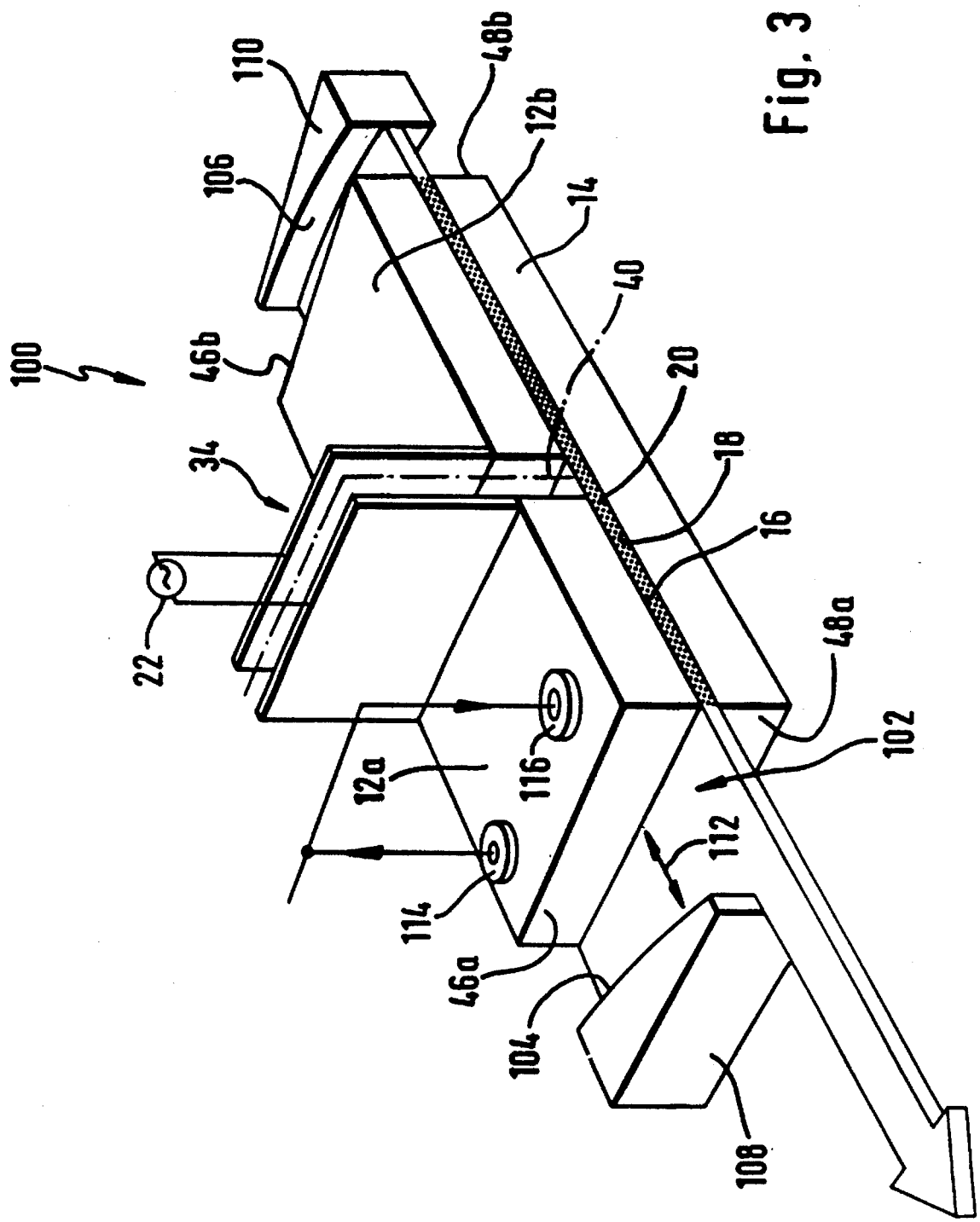
FIG. 3 a perspective illustration of the gas discharge structure in accordance with the invention according to FIG. 1 as a part of a diffusion cooled laser waveguide that is implemented as a strip line laser.

A first embodiment of a gas discharge structure in accordance with the invention, which is illustrated in FIG. 1 and referenced as a whole by 10, comprises a first electrode 12 and a second electrode 14 which have mutually facing electrode surfaces 16 and 18 respectively. A gas discharge space, in which a plasma gas is disposed and which is referenced as a whole by 20, is located between these electrodes 12 and 14. A two-dimensional gas discharge extending substantially uniformly over the expanse of the electrode surfaces 16 and 18, for which purpose the electrode surfaces 16 and 18 preferably extend at a constant distance from one another, can be produced in the gas discharge space 20 by feeding in high frequency electrical energy in the frequency range from 1 MHz to 1 GHz from a high frequency source 22.

A substantially uniform coupling and distribution of the high frequency electrical current over the respective electrode surfaces 16 and 18 is required in order to obtain a current density which is approximately the same throughout the plasma gas in the gas discharge space i.e. a current density which varies in value by less than 10% or, even better, by less than 5%.

For this reason, the first electrode 12 is divided into two partial electrodes 12a and 12b which are electrically separate from one another and that have respective adjacent partial electrode surfaces 16a and 16b located in the first electrode surface 16a and respective mutually facing end regions 26a and 26b that are disposed at a distance from one another which ensures the electrical isolation of the partial electrodes 12a and 12b from one another.

Respective feed terminals 28a and 28b, via which a supply of high frequency electrical current to the two partial electrode surfaces 16a and 16b from the high frequency source occurs, are provided at those end regions 26a and 26b of the partial electrodes 12a and 12b that are disposed at a distance from one another, whereby this high frequency current flows in the form of a surface current 30a and 30b on the mutually facing outer faces 32a and 32b of a supply line that is referenced as a whole by 34. In this case, the supply line 34 is constructed as a strip line for example, which comprises two flat strip conductors 36 and 38 that run parallel to one another and support the outer faces 32a and 32b. Here, the flat strip conductor 36 is connected to the feed terminal 28a of the partial electrode 12a and the flat strip conductor 38 is connected to the feed terminal 28b of the partial electrode 12b.

If, for example, the flat strip conductor 38 is connected to a terminal of the high frequency source 22 which has a positive potential +U and the flat strip conductor 36 is connected to a terminal of the high frequency source 22 which lies at a negative potential −U, then the surface current 30b flows on the outer face 32a of the flat strip conductor 38 towards the partial electrode 12b and over an edge region 24b of its partial electrode surface 16b and then, by virtue of the formation of a plasma, through the plasma gas in the gas discharge space onto the electrode surface 18, and in fact, onto a region 18b which is located opposite to the partial electrode surface 16b, and from this region 18b onto a region 18a which is located opposite to the partial electrode surface 16a, and from there, once more by virtue of the formation of a plasma in the plasma gas, through the gas discharge space 20 onto the electrode surface 16a and, from there, via the edge region 24a facing the edge region 24b, as a surface current 30a over the outer surface 32a back to the high frequency source 22.

An approximately, substantially similar current density in the plasma between the electrode surface 16b and the region 18b of the electrode surface 18 as well as between the region 18a of the electrode surface 18 and the partial electrode surface 16a can then be achieved if the electric field strength E is substantially constant in the direction of prolongation of the electrode, preferably in the longitudinally extending direction.

The value of the field strength E illustrated in FIG. 2 is then substantially the same if, commencing from a plane of symmetry 40, the prolongation of the partial electrode surfaces 16a and 16b occurs in opposite directions 42 and 44 over a length which, commencing from the plane of symmetry 40 as the zero reference point, is preferably smaller than one fifth—or, even better, smaller than one tenth—of the wavelength of the high frequency current insofar as no additional impedance is provided between the mutually remote ends 46a and 46b of the partial electrodes 12a and 12b and the ends 48a and 48b of the electrode 14 located opposite thereto so that these ends function in effect as open ends of a waveguide for the high frequency current.

The electrode 14 is thus automatically set to an intermediate potential which preferably lies between the potential of the two partial electrodes 12a and 12b.

An embodiment of the gas discharge structure exemplified in FIGS. 1 and 2 is put to use pre-eminently, as illustrated in FIG. 3, in a laser waveguide which is referenced as a whole by 100. In this laser waveguide, a resonator radiation field 102 extends between the respective reflecting surfaces 104 and 106 of two mirrors 108 and 110 of the laser waveguide whereby the resonator radiation field 102 and the predominant part of its extension in a direction along an optical axis 112 of the laser is guided by reflection between the electrode surfaces 16 and 18 and, in this case, the electrode surfaces 16 and 18 have to be constructed so as to be reflecting for the light of the resonator radiation field 102.

Thus, the electrode surfaces 16 and 18 of the gas discharge structure simultaneously form the waveguide surfaces 16 and 18 for the optical waveguide extending between the mirrors 108 and 110.

Moreover, the electrodes 12 and 14 are also cooled so that the plasma gas in the gas discharge space can be cooled by diffusion and collisions with the electrode surfaces 16 and 18. In this case, as is chiefly illustrated at the partial electrode 12, each of the electrodes 12 and 14 is provided with terminations 114 and 116 for the introduction of a cooling medium which preferably flows through these into channels running within the electrodes 12 and 14 and therefore cools them.

Here, the plane of symmetry 40 preferably lies approximately in the middle between the reflecting surfaces 104 and 106 and preferably runs perpendicularly to the optical axis 112 so that the partial electrodes 12a and 12b extend on each side of the plane of symmetry 40 and consequently their remote ends 46a and 46b and also 48a and 48b are arranged so as to face the respective reflecting surfaces 104 and 106.

In this case, the plasma gas provided in the gas discharge space 20 is the laser gas, for example, a $CO_2$ mixture which is usually used for a laser waveguide so that the laser waveguide functions as a $CO_2$ laser.

The plasma gas serving as the laser gas is placed into an excited state, which is necessary for laser action, by the formation of the plasma between the electrodes 16 and 18.

Figure 4:
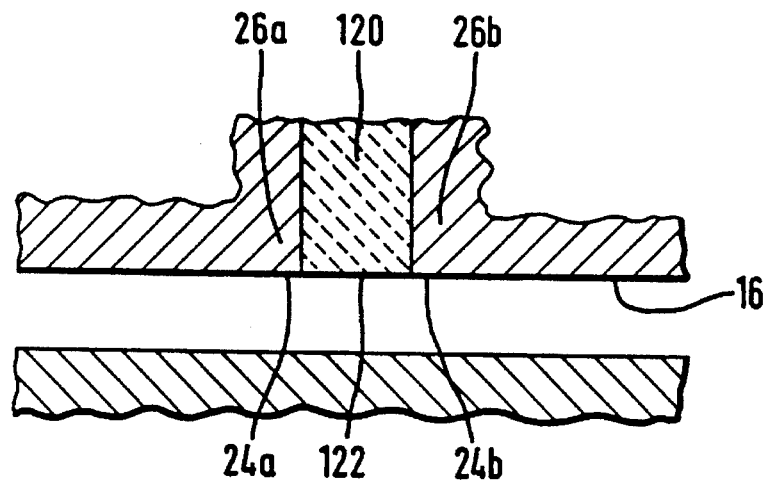
FIG. 4 a schematic, sectional illustration of the gas discharge structure in accordance with the first embodiment in the vicinity of the mutually facing end regions of the partial electrodes.

In order to achieve the aim that the gas discharge structure be capable of fulfilling its function as an optical waveguide which is as loss free as possible, it is provided in a first variant of the first embodiment which is illustrated in FIG. 4, that an intermediate space between the mutually facing end regions 26a and 26b is bridged by a non-conducting intermediate piece 120 which has an outer face 122 that extends between the end regions 26a and 26b and represents a continuation of the partial electrode surfaces 16a and 16b for forming the continuous waveguide surface 16. Here, the intermediate piece consists of a material which is of a type such that it too is capable of reflecting the light of the resonator radiation field 102 in a similar manner to the electrode surfaces 16a, 16b and 18 so that the resonator radiation field 102 is guided between the ends 46a and 48a and the ends 46b and 48b of a continuous optical reflecting surface.

Figure 5:
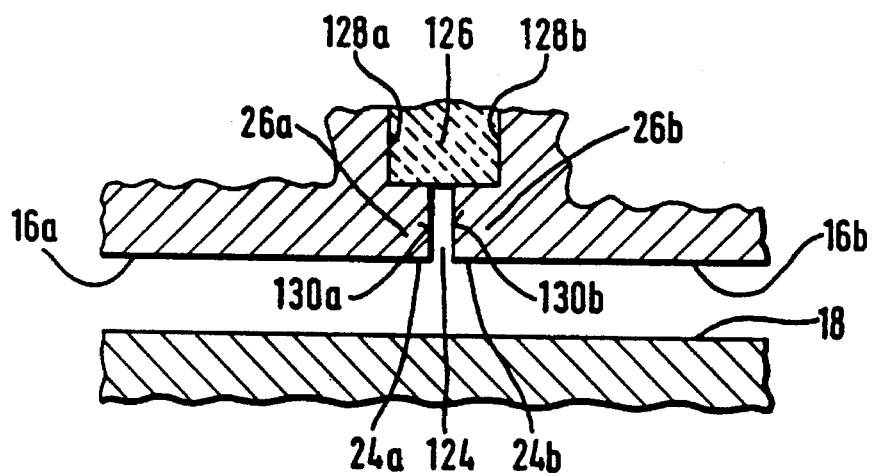
FIG. 5 an illustration similar to FIG. 4 of a second variant.

In a second variant illustrated in FIG. 5, it is provided that the mutually facing regions 26a and 26b close to the partial electrode surfaces 16a and 16b merely form a narrow gap 124 which extends away from the partial electrodes 16a and 16b towards an intermediate piece 126 that closes the gap 12 at its side remote from the partial electrode surfaces 16a and 16b. The intermediate piece 126 is likewise preferably formed of an insulating medium and extends between two end wall surfaces 128a and 128b of the end regions 26a and 26b which have a greater separation from each other than those wall surfaces 130a and 130b of the gap 124 which border directly onto the edge regions 24a and 24b of the partial electrode surfaces 16a, b.

The separation between the wall surfaces 128a and 128b is preferably selected such that, by virtue of a continuation thereof, contact can be made with the faces 32a and 32b of the flat strip conductors 36 and 38 so that the separation between the wall surfaces 128a and 128b preferably corresponds to the separation between the faces 32a and 32b of the flat strip conductors 36 and 38.

The advantage of this solution can be seen in that the separation of the wall surfaces 130a and 130b in the gap 124 can be selected such that there is no resulting formation of a plasma despite the fact that a plasma gas is present in the gap 124 since the separation is much smaller than the separation preferred for an optimal build-up of plasma with the given parameters of the plasma gas. On the other hand, the separation between the partial electrode surfaces 16a and 16b and the electrode surface 18 is selected such that there is an optimum build-up of plasma over this distance.

Figure 6:
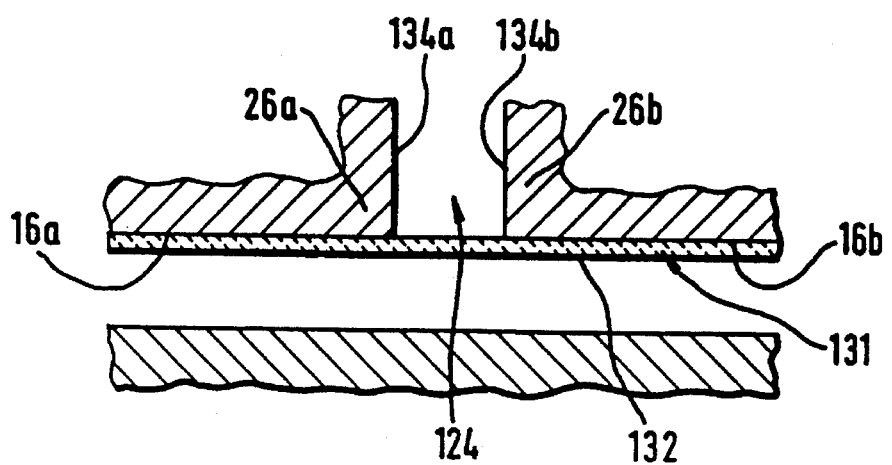
FIG. 6 an illustration similar to FIG. 4 of a third variant.

In a third variant illustrated in FIG. 6, the partial electrode surfaces 16a and 16b do not form the waveguide surfaces directly but rather, a covering 131 is provided on the partial electrode surfaces 16a and 16b which in turn supports an optical waveguide surface 132. The covering 131 thereby extends not only over the partial electrode surfaces 16a and 16b but also over the gap 124, the intermediate space between the end regions 26a and 26b, and therefore seals this from any ingress of plasma gas. A separation between the end surfaces 134a and 134b of the end regions 26a and 26b can therefore be selected in such a way that it is possible to have an optimum match with the supply line 34.

The covering 131 is preferably made from a dielectric, in particular, a ceramic material which, on the one hand, does not interfere with the formation of the electric field E between the partial electrode surfaces 16a and 16b and the electrode surface 18 but the face 132 of which, on the other hand, has optimum reflective properties for the resonator radiation field 102.

In a second embodiment of a gas discharge structure in accordance with the invention which is illustrated in FIG. 7, the electrodes are not flat and platelike as in the first embodiment in accordance with FIGS. 1 and 2 but rather, the first electrode 212 is formed as an outer cylinder in which the second electrode 214 is disposed as an inner cylinder so that the first electrode surface 216 of the outer cylinder is formed by an inner cylindrical surface thereof while an outer cylindrical surface of the inner cylinder 214 represents the second electrode surface 218 thereof.

Thus, the gas discharge space 220 is a cylindrical space having an annular cross-section between the outer cylinder 212 forming the first electrode and the inner cylinder 214 forming the second electrode.

For their part, the partial electrodes 216a and 216b are formed as cylindrical sections of the outer cylinder 212 which extend on both sides of the plane of symmetry 40 and which are arranged at a distance from one another at their end regions 226a and 226b. Preferably, the outer cylinder 212 and the inner cylinder 214 are arranged coaxially of a common cylindrical axis 210 so that the whole arrangement is rotationally symmetrical about the cylindrical axis 210. Respective mirrors 250 and 252 are provided in the vicinity of the mutually remote ends 246a and 248a, and 246b and 248b, by means of which, a resonator radiation field 254, which extends through the gas discharge space 220, is bounded.

An intermediate piece 260, whose outer face 262 connects the partial electrode surfaces 216a and 216b together so as to form a continuous cylindrical surface 216 in a direction along the cylindrical axis 210 as described in connection with FIG. 4, extends between the end regions 226a and 226b of the partial electrodes 216a and 216b for forming an optical waveguide surface for the resonator radiation field 254, which waveguide surface is continuous in a direction along the cylindrical axis 210, whereby, the intermediate piece 260 is an insulating intermediate piece as already portrayed in FIG. 4. As an alternative thereto, it is also conceivable to form the intermediate piece and the end regions of the partial electrodes in accordance with FIG. 5 or to use a covering in accordance with FIG. 6.

The supply of high frequency current to the partial electrodes 212a and 212b via the feed terminals 228a and 228b is effected by a plurality of high frequency sources 270 (FIG. 8) which are radially disposed around the first electrode 212 and are all connected in parallel and whose respective outputs 272a and 272b are all at the same potential, whereby the outputs 272a and 272b are connected directly to the respective feed terminals 228a and 228b of the partial electrodes 212a and 212b.

The high frequency sources 270 preferably comprise power output stages 274 using semiconductor elements so that it is particularly advantageous to arrange a plurality of power output stages 274 of this type in parallel with one another whereby, in particular, the power output stages 274 are distributed at the same angular distances about the cylindrical axis 210 and their respective outputs 272a and 272b are directly connected to the partial electrodes 212a and 212b.

Preferably, these power output stages 274 are controlled by a common frequency generator 276 so that it is ensured that each of the high frequency sources 270 feeds in the same frequency to the partial electrodes 212a and 212b.

In addition, a particularly advantageous mounting for the mirrors 250 and 252 is preferably provided in the second embodiment which is illustrated in FIG. 7. The mounting 280 for the mirror 250 is made of electrically non-conducting material and engages with an inner surface 284 of the inner cylinder 214 by means of an inner flange 284 and with an outer surface 288 of the outer cylinder 212 by means of an outer flange 286 and it extends between the flanges 282 and 286 by virtue of a wall 290 which supports the mirror so that the mounting 280 preferably also forms a gas tight termination for the gas discharge space 220 in the vicinity of the respective ends 246a and 248a.

In like manner, a mounting 292 for the mirror 252 is likewise provided with an inner flange 294 and an outer flange 296 which respectively abut on the inner sides 284 and 288 of the inner cylinder 214 and the outer cylinder 212. The mirror 252 preferably extends between these two flanges 294 and 296 and likewise forms a gas tight termination for the gas discharge space 220 in the vicinity of the ends 246b and 248b.

Only the gas discharge structure is depicted in a first variant of the second embodiment which is illustrated in FIG. 9, this being capable of being expanded into a laser by the mirrors 250 and 252 in a similar manner as for FIG. 7.

Insofar as the same parts are utilised in this variant, as are utilised in the second embodiment, the same reference symbols are used for these as are used in FIG. 7 and FIG. 8 so that, likewise, one can be referred to the comments in respect of the second embodiment which is illustrated in FIG. 7 and FIG. 8 as regards the description of these parts.

In contrast to the second embodiment which is illustrated in FIG. 7 and FIG. 8, only a single high frequency source 300 is provided and its outputs 302 and 304 are respectively connected to an inner conductor 306 and an outer conductor 308 of a coaxial cable 310 which is led to the cylindrically shaped partial electrodes 212a and 212b.

Here, the outer conductor 308 is connected to a front wall 312 of a screening housing 314 which surrounds the outer cylinder forming the first electrode 212 by means of a screening cylinder 316 that is preferably arranged coaxially of the cylindrical axis 210. Preferably thereby, the output 304 of the high frequency source 300 is the earth output so that the screening means 314 is likewise at earth potential.

The inner conductor 306 of the coaxial cable is led into the screening means 314 and connected to a terminal disc 320 which is parallel to the front wall 312 and, extending therefrom, there is also a terminal cylinder 322 which is connected conductively to the end 246a of the outer cylinder.

Furthermore, a connecting disc 324 is also provided between the screening cylinder 316 and the feed terminal 228b of the partial cylinder 212b.

Commencing from the coaxial cable 310, there is now built-up within the screening means a surface current 330a that comes from the inner conductor 306 and flows on an outer side 334 of the terminal disc 320 and an outer side 336 of the terminal cylinder 322 onto an outer side 288 of the partial cylinder 212b and then upon this up to the feed terminal 228a thereof, and then over this onto the partial electrode surface 216a. In like manner, a surface current 330b flows from the partial electrode surface 216b over the feed terminal 228b and the connecting disc 324 onto an inner side 326 of the screening cylinder 316 and then along this towards the front wall 312 of the screening means 314 and then further onto an inner side 328 of the front wall 312 up to the outer conductor 308 of the coaxial cable 310.

Using this variant of the second embodiment, it is possible in simple manner to supply the gas discharge structure by means of a single high frequency source 300 whereby there is simultaneously provided an all-round screening of the gas discharge structure 200 against high frequency radiation in any direction by means of the screening means 314.

In order to allow contact to be easily made and to simplify the construction, the connecting disc 324 is preferably segmented in the azimuthal direction and provided with tongues in order to produce an electrical contact between the screening cylinder 316 and the partial electrode 212b.

Similarly, either the terminal disc 320 or the terminal cylinder 322 is likewise segmented in the azimuthal direction and provided with tongues in order to likewise permit electrical contact to be easily made to the partial electrode 216a.

Figure 10:
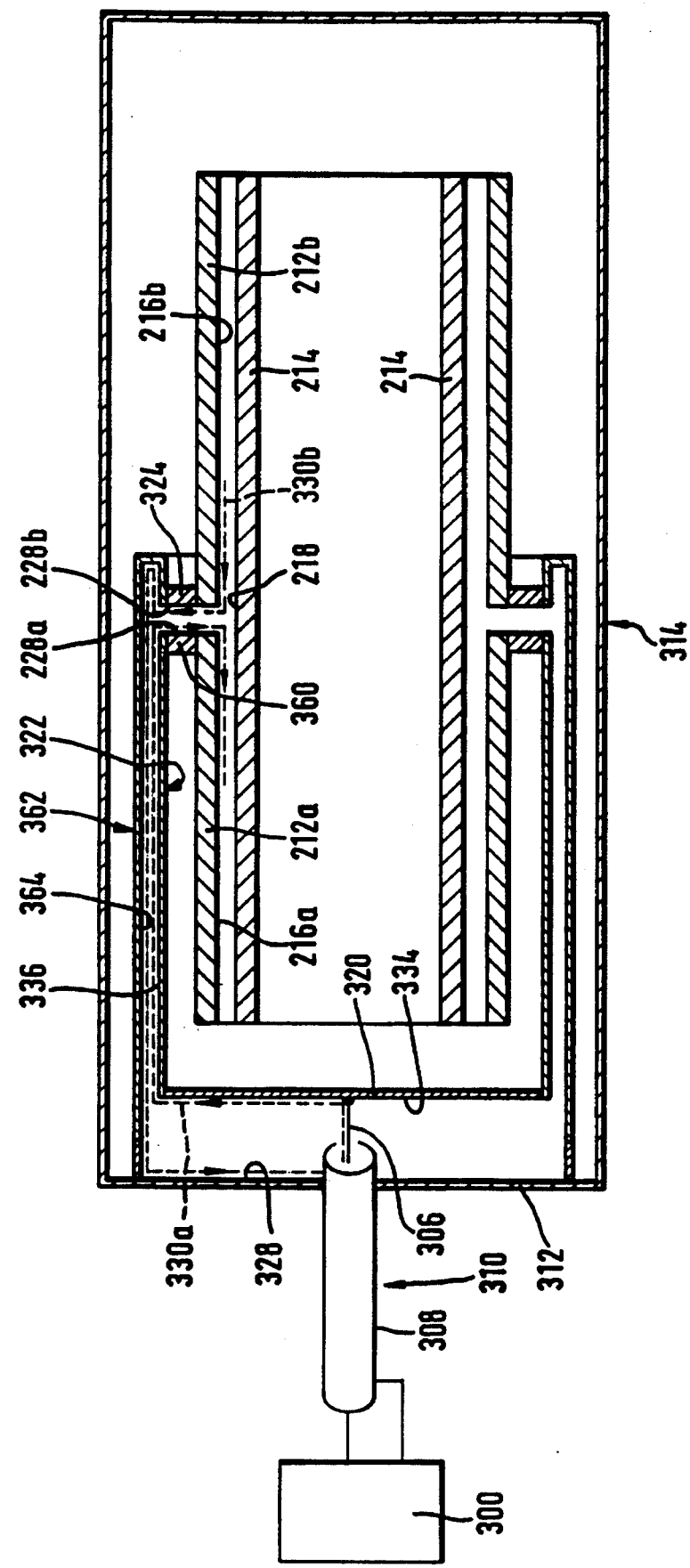
FIG. 10 a longitudinal section similar to FIG. 7 through a second variant of the second embodiment of the gas discharge structure in accordance with the invention.

In a second variant of the second embodiment which is illustrated in FIG. 10, the terminal cylinder 322 is drawn from the terminal disc 320 up to a connecting disc 360 which connects the terminal cylinder 322 to the feed terminal 228a. Furthermore, the connecting disc 324 is carried up to a terminal cylinder 362 which runs within the screening cylinder 314 and extends in parallel with the terminal cylinder 322 i.e. up to the front wall 312 to which it is conductively connected. Consequently, the surface current 330a flows from the inner conductor 306 over the outer side 334 of the terminal disc 320 up to the terminal cylinder 322, upon its outer surface 336 up to the connecting disc 360 and then up to the feed terminal 328a. In the same way, the surface current 330b flowing in the reverse direction runs from the feed terminal 228b over the connecting disc 324 to the terminal cylinder 362 and then upon its inner side 364 facing the terminal cylinder 322 up to the front wall 312 of the outer cylinder and upon its inner side 328 up to the outer conductor 308 of the coaxial cable 310.

The second variant of the second embodiment is otherwise constructed in the same manner as the first variant so that the same reference symbols are made use of for the similar parts and, it also follows from this, that as regards the description thereof, one can be referred to the comments in respect of the second embodiment in FIG. 8.

Figure 11:
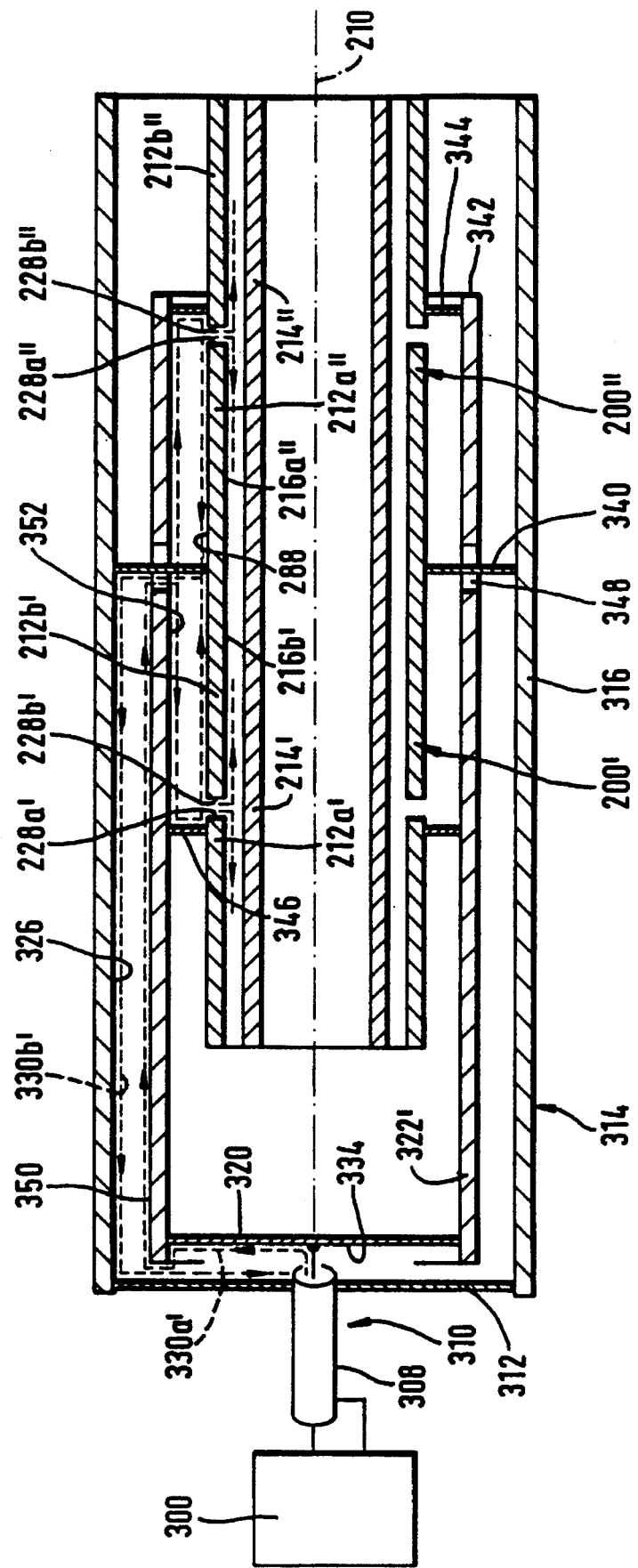
FIG. 11 a longitudinal section similar to FIG. 7 through a third variant of the second embodiment of the gas discharge structure in accordance with the invention.

In a third variant of the second embodiment which is illustrated in FIG. 11, two gas discharge structures 200' and 200" are successively disposed in a direction along the cylindrical axis 210 in order to achieve a greater prolongation of the gas discharge space in a direction along the cylindrical axis 210, whereby the partial electrodes 212' and 212b' as well as 212a" and 212b" are supplied from the same high frequency source 300 and the second electrodes 214' and 214" are formed by a continuous inner cylinder.

It is provided furthermore that the partial electrodes 212b' and 212a" are at the same potential. To this end, they are connected via individual connecting studs 340, that are arranged successively in the azimuthal direction, to the screening cylinder 316 which, for its part, is again a part of the screening means 314 and is connected via the front wall 312 to the outer conductor 308 of the coaxial cable 310.

Furthermore, commencing from the terminal disc 320, the terminal cylinder 322' is realised as a cylinder between the outer cylinder 212 and the screening cylinder 316 and extends in a direction along the cylindrical axis 210 as far as the partial electrode 212b" which is remote from the terminal disc 320 so that it is connected at one end 342 via a connecting disc 344 to the feed terminal 228b" of the partial cylinder 212b".

A connection to the feed terminal 228a' occurs in like manner via a terminal disc 346 to the terminal cylinder 322'.

In order for the connecting studs 340 to be able to penetrate the terminal cylinder 322', the latter is provided with apertures 348 through which the connecting studs 340 reach in all electrically insulating manner visa vis the terminal cylinder 322'.

In this variant, the surface current 330a' now flows over the outer surface 334 of the terminal disc 320 and over an outer side 350 of the terminal cylinder 322' up to the apertures 348, through these and onto an inner side 352, then along this up to the connecting discs 344 and 346 and then over these to the feed terminals 228a' and 228b".

Furthermore, a surface current 330b' flows from the partial electrode surfaces 216b' and 216a" up to the feed terminals 228b' and 228a", then from the latter over the outer side 288 of the partial cylinders 212b' and 212a" up to the connecting stud 340 and then over this to the inner side 326 of the screening cylinder 316 and then over the inner side 328 of the front wall 312 back to the outer conductor 308 of the coaxial cable 310.

In order, in particular, to achieve a uniform current distribution, the connecting stud 340 is preferably disposed approximately midway between the feed terminals 228b' and 228a" in a direction along the cylindrical axis 210.

Figure 12:
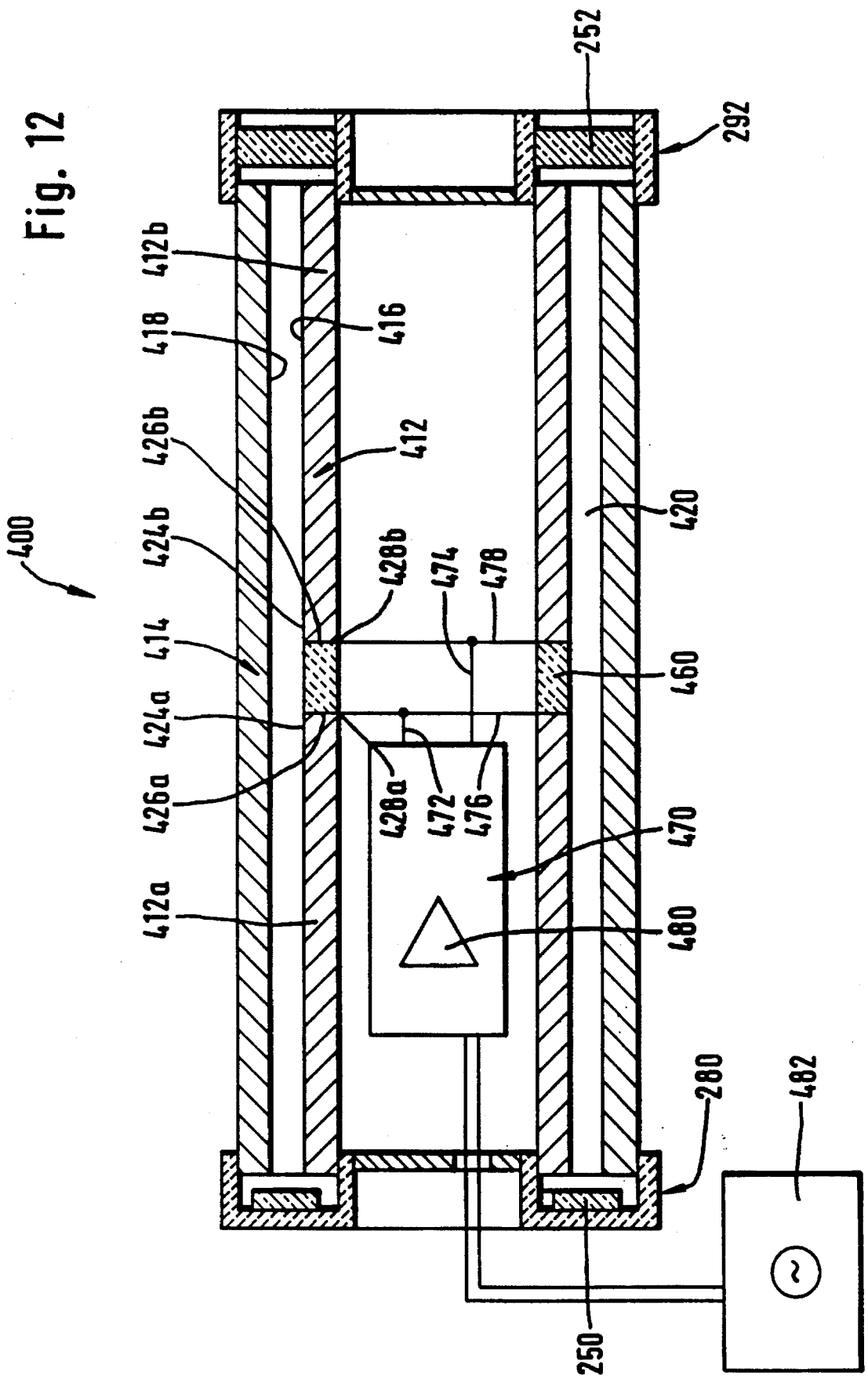
FIG. 12 a longitudinal section similar to FIG. 1 through a third embodiment of a gas discharge structure in accordance with the invention which is likewise integrated into a laser waveguide.

A third embodiment of a gas discharge structure 400 in accordance with the invention which is illustrated in FIG. 12 provides that the first electrode 412 is formed by an inner cylinder while a second electrode 414 is formed by an outer cylinder so that an inner surface of the outer cylinder 414 forms the second electrode surface 418 while an outer surface 416 of the inner cylinder 412 forms the first electrode surface.

In a similar manner to the previously described embodiments, the first electrode 412 is divided into two partial electrodes 412a and 412b whose mutually facing end regions 426a and 426b are provided with feed terminals 428a and 428b.

A supply of high frequency current is effected via these feed terminals 428a and 428b by means of a high frequency source 470 which is preferably disposed on the inside of the inner cylinder 412 and the outputs 472 and 474 of which are connected by respective short leads 476 and 478 to the feed terminals 428a and 428b. The high frequency source 470 preferably comprises a power output stage 480 formed by a valve and a supply means 482 therefor, wherein the supply means 482 is disposed outside the inner cylinder 421.

Consequently, a plasma can be produced in the gas discharge space 420 in a manner similar to that for the second embodiment illustrated in FIG. 7.

In all other respects, the third embodiment functions as already described in connection with the first and the second embodiments.

Furthermore, mirrors 250 and 252 of a resonator, which are arranged in respective mountings 280 and 292, are also provided in the third embodiment. As regards these, reference is likewise made to the full contents of the explanations relating to the second embodiment.

In a first variant of the third embodiment which is illustrated in FIG. 13, the supply to the gas discharge structure 400 is effected over the coaxial cable 310 from an externally disposed high frequency source 300, these being constructed in exactly the same way as for the embodiment in accordance with FIG. 9 so that as regards these, reference is made to the full contents of the explanations in accordance with FIG. 9.

A terminal cylinder 500, which is arranged coaxially relative to the cylindrical axis 210 and which extends coaxially relative to the cylindrical axis 210 and is connected via a connecting disc 502 to the feed terminal 428b, is disposed within the inner cylinder 412 for supplying current to the partial electrode 412b via its feed terminal 428b.

Furthermore, the terminal cylinder 500 is closed at its front side by means of a terminal plate 504 which is connected to the inner conductor 306 of the coaxial cable 310.

The outer conductor 308 is connected to a screening means which is referenced as a whole by 506 and which surrounds the outer cylinder 414 by virtue of a screening cylinder 508 and is closed at its respective front faces by discs 510 and 512, wherein the disc 510 is taken directly to the outer conductor 308 of the coaxial cable 310.

In addition, a further terminal cylinder 516 leads from an inner side 514 of the disc 510 to the partial electrode 412a.

The surface current 330a now flows from an outer side of the inner conductor 306 over an outer side 518 of the terminal cylinder 500 up to the connecting disc 502 and upon the latter up to the feed terminal 428b so that it can flow from this feed terminal 428b onto the partial electrode surface 416b. Furthermore, the surface current 330b flows from the partial electrode surface 416b over the feed terminal 428a onto an inner side 520 of the partial electrode 412a which is formed as an inner cylinder, the inner side 520 being located opposite to the terminal cylinder 500, and then over this inner side up to the end 446a thereof to which the further terminal cylinder 516 is connected so that the surface current can then flow further upon an inner side 522 of the terminal cylinder to the inner side 514 of the disc 510 and then upon the latter to the outer conductor 308 of the coaxial cable 310.

In a second variant of the third embodiment which is illustrated in FIG. 14, two of the gas discharge structures in accordance with FIG. 13 are successively disposed in a direction along the axis 210 whereby the two second electrodes 414' and 414" form a continuous electrode in the form of the outer cylinder.

Furthermore, the partial electrodes 412b' and 412a" likewise form a common electrode. This is connected to the terminal cylinder 500, which is connected in turn to the inner conductor 306 of the coaxial cable 310 as already described, for the supply of a high frequency current via the connecting stud 540.

In addition, the further terminal cylinder 516 is inserted into the electrodes 412' and 412" such that it is coaxial relative to the cylindrical axis 210, lies between the terminal cylinder 500 and the first electrodes 412' and 412" and extends up to the partial electrode 412b", to which it is connected by means of a connecting disc 542. In like manner, a connecting disc 544 constitutes a connection between the further terminal cylinder 516 and the partial electrode 412a'.

For its part, the connecting stud 540 now penetrates an aperture 546 in the further terminal cylinder 516 in an electrically insulating manner and leads directly to an inner side 548 of the partial electrodes 412b' and 412a".

The surface current 530a now flows in the manner already described from the inner conductor 306 of the coaxial cable 310 over the outer side 518 of the terminal cylinder 500 up to the connecting stud 540 and upon this to the inner sides 548 of the partial electrodes 412b' and 412a" and upon these up to their feed terminals 428b' and 428a" and then from these onto the partial electrode surfaces 416b' and 416a".

A surface current passes from the partial electrode surfaces 416a' and 416b" over the respective corresponding feed terminals 428a' and 428b" and also the terminal discs 542 and 544 onto an outer side 550 of the further terminal cylinder 516 and then the surface current 530b flows upon this through the aperture 546 and onto an inner side 552 of the further terminal cylinder 516 up to the inner side 514 of the disc 510 of the screening means which is referenced as a whole by 506.

In a fourth embodiment which is illustrated in FIG. 15, the coaxial cable 310 coming from the high frequency source 300 leads into a gas discharge structure in accordance with the invention which, from an electrical point of view, is simultaneously formed as a symmetrical member. On the basis that the terminal 304 of the high frequency source is the earth terminal and hence that the outer conductor 308 of the coaxial cable 310 is at earth potential, the effect of the symmetry is that the partial electrode 412a is at a voltage of −U/2 and the partial electrode 412b is at a voltage of +U/2 when using an electrode arrangement in accordance with the third embodiment which is illustrated in FIG. 13.

The symmetrical arrangement is obtained by feeding the coaxial cable 310 into a screening means 600 up to a terminal disc 602 which is connected to the outer conductor 308 of the coaxial cable 310 and extends up to the feed terminals 428a of the partial electrode 412a, wherein the screening means 600 is referenced as a whole by 600 and surrounds the pair of electrodes comprising the electrodes 412 and 414. Furthermore, the inner conductor 306 is continued up to a terminal disc 604 which extends from the inner conductor 306 up to the feed terminals 428b of the partial electrode 412b. Here, the terminal discs 602 and 604 are parallel to one another.

Furthermore, the partial electrodes 412a and 412b extend away from the respective terminal discs 428a and 428b in respectively opposite directions 442 and 444 up to their respective ends 446a and 448a, and 446b and 448b. The second electrode 414 is now connected to the screening means 600 by two natural, i.e. due to the geometrical dimensions of the construction and the electrical properties of the material, stray capacitances C1 and C2. This screening means comprises the pair of electrodes 412 and 414 and is connected via a front wall 606 to the outer conductor 308 at a terminal point M. In respect of its electrical properties, the arrangement, comprising a section of the outer conductor 308 extending between the terminal M and the connecting disc 602 and the attached partial electrodes 412a and 412b together with the screening means 600, forms a lambda/4 symmetrical member in accordance with the same principle as is disclosed at pages 104 and 105 of the textbook "Hochfrequenztechnik" by Zinke and Brunswig (1965).

For given geometric ratios, the arrangement is tuned for resonance at the operating frequency, which is effected, for example, by wiring it up with additional discrete components such as capacitors and inductances and/or by altering the natural stray capacitances C1 and C2 by altering the geometrical separation of the screening means 600 from the electrode 414.

If the total arrangement within the screening means 600 is longer than lambda/4 of the operating frequency, then inductances have to be connected in parallel with the stray capacitances C1 and C2.

This symmetrical arrangement can be achieved for all of the embodiments in accordance with FIGS. 7, 9, 10, 12, 13 and 15 if all of the arrangements within the screening means 600 are in accord with the operating frequency as regards their electrical resonant frequencies.

It is always advantageous thereby if the partial electrodes 412a and 412b are electrically symmetrical with respect to earth or the screening means.

It is possible to set the desired symmetrical voltage distribution to the partial electrodes 412a and 412b exactly, by means of the adjustment of the resonant frequency in the manner described, for example, by means of the capacitances C1 and C2. To this end, there is preferably provided a measuring instrument 700 with which the impedance between the partial electrode 412b and the screening means 600 can be measured.

The construction of the partial electrodes 412a and 412b as well as that of the second electrode 414 otherwise corresponds to the construction in accordance with the third embodiment illustrated in FIG. 12 so that the same reference symbols have been used and, for the rest, one can be referred to the detailed description relating to the third embodiment.

The present disclosure relates to the subject matter disclosed in German application No. P 44 16 900.0 of May 13, 1994, the entire specification of which is incorporated herein by reference.

We claim:

1. Gas discharge structure for two-dimensionally extending gas discharges comprising an electrode unit, said electrode unit comprising:

first and second electrodes with mutually facing electrode surfaces;

a gas discharge space arranged between said first and second electrode surfaces with a plasma gas provided therein; and a high frequency source for feeding a current into said electrode unit for producing a plasma between the first and the second electrode surfaces;

wherein said first electrode surface is divided into a first partial electrode surface and a second partial electrode surface;

said first partial electrode surface including a first edge region, and said second partial electrode surface including a second edge region;

said first partial electrode surface and said second partial electrode surface being electrically insulated from one another;

said first edge region and said second edge region being adjacent to one another and extending at a defined distance from one another;

said first and second partial electrode surfaces being connected to two feed terminals of the high frequency source which are at different potentials in such a way that an electrical current flows over one of said first and second edge regions to one of said first and second partial electrode surfaces and over another of said first and second edge regions off from another of said first and second electrodes; and the potential of said second electrode being at a level which is intermediate to the potentials of said first and second partial electrode surfaces.

2. Gas discharge structure in accordance with claim 1, wherein said second electrode is at an intermediate potential such that the current density in the plasma gas is approximately the same between (a) said first partial electrode surface and a region of the second electrode surface which is located opposite to said first partial electrode surface, and (b) said second partial electrode surface and a region of the second electrode surface which is located opposite to said second partial electrode surface.

3. Gas discharge structure in accordance with claim 1, wherein said second electrode is arranged to be on a non-fixed potential.

4. Gas discharge structure in accordance with claim 1, wherein a substantially constant field strength (E) exists between (a) said first partial electrode surface and a region of the second electrode surface which is located opposite to said first partial electrode surface, and (b) said second partial electrode surface and a region of the second electrode surface which is located opposite to said second partial electrode surface.

5. Gas discharge structure in accordance with claim 1, wherein the field strength (E) has a value which is close to the maximum value of the field strength (E) for an electric waveguide formed by said first and second electrode surfaces.

6. Gas discharge structure in accordance with claim 1, wherein said first and second electrode surfaces form a waveguide, and wherein end portions of said first and second electrode surfaces which are located remote from said first and second adjacent edge regions form an open end of said waveguide.

7. Gas discharge structure in accordance with claim 1, wherein, commencing from said first and second adjacent edge regions, said first and second partial electrode surfaces extend in mutually opposite directions.

8. Gas discharge structure in accordance with claim 7, wherein said first and second partial electrode surfaces extending in mutually opposite directions have an elongation which is less than one-fifth of the wavelength of said high frequency source.

9. Gas discharge structure in accordance with claim 1, wherein said first and second partial electrode surfaces are arranged on electrically insulated first and second partial electrodes.

10. Gas discharge structure in accordance with claim 9, wherein said first and second partial electrodes are connected no feed terminals for a high frequency supply line.

11. Gas discharge structure in accordance with claim 10, wherein the feed terminal of said first partial electrode is located in an end region of said first partial electrode which faces said second partial electrode.

12. Gas discharge structure in accordance with claim 10, wherein current is supplied via a rear surface of one of said first and second partial electrodes which is remote from said second electrode.

13. Gas discharge structure in accordance with claim 10, wherein a high-frequency supply line is formed as an electric waveguide leading from said high-frequency source to said feed terminals.

14. Gas discharge structure in accordance with claim 13, wherein the high-frequency supply line to at least one of said feed terminals is effected by means of a terminal cylinder.

15. Gas discharge structure in accordance with claim 13, wherein the high-frequency supply line up to said feed terminals is formed as a surface current conducting waveguide.

16. Gas discharge structure in accordance with claim 9, wherein wall surfaces between end regions of said first and second partial electrodes extend at a distance from one another such that plasma is not formed between said wall surfaces.

17. Gas discharge structure in accordance with claim 9, wherein an isolating medium is inserted between mutually facing end regions of said first and second partial electrodes.

18. Gas discharge structure in accordance with claim 9, wherein a high-frequency supply line feeds said first and second partial electrodes symmetrically.

19. Gas discharge structure in accordance with claim 18, wherein said high-frequency supply line forms a symmetric generating member together with said first and second electrodes.

20. Gas discharge structure in accordance with claim 9, wherein the high frequency source is arranged in the immediate vicinity of said feed terminals.

21. Gas discharge structure in accordance with claim 1, wherein a surface current for the production of the plasma flows exclusively over said adjacent first and second edge regions of said first and second partial electrode surfaces.

22. Gas discharge structure in accordance with claim 1, wherein said adjacent first and second edge regions of said first and second partial electrode surfaces extend at a distance from one another such that a part of the gas discharge space bordering on said first and second edge regions is free of any plasma being formed therebetween.

23. Gas discharge structure in accordance with claim 1, wherein the gas discharge structure is surrounded by a screening means.

24. Gas discharge structure in accordance with claim 1, wherein said first and second electrode surfaces are cylindrical.

25. Gas discharge structure in accordance with claim 24, wherein said first and second electrode surfaces are formed as cylindrical surfaces which are closed in the azimuthal direction.

26. Gas discharge structure in accordance with claim 1, wherein the gas discharge structure in accordance with the invention is part of a waveguide laser.

27. Gas discharge structure in accordance with claim 26, wherein optical waveguide surfaces, which guide a radiation field of the waveguide laser between mirrors, are arranged between said first and second electrodes.

28. Gas discharge structure in accordance with claim 27, wherein said second electrode surface forms an optical waveguide surface for the laser beam.

29. Gas discharge structure in accordance with claim 27, wherein said first electrode forms (a) a waveguide surface by means of said first and second partial electrode surfaces and (b) a space between said adjacent edge regions of said first and second partial electrode surfaces, said space being less than the distance between said first and second electrode surfaces.

30. Gas discharge structure in accordance with claim 27, wherein said first electrode surface forms a waveguide surface by means of said first and second partial electrode surfaces, and a space between said adjacent edge regions of said first and second partial electrode surfaces is bridged by an isolating section, said isolating section having an outer face which forms a continuous optical waveguide surface in conjunction with said first and second partial electrode surfaces.

31. Gas discharge structure in accordance with claim 27, wherein a dielectric element, which supports said optical waveguide surface, is located on said first and second partial electrode surfaces.

* * * * *